United States Patent
Lin et al.

(10) Patent No.: US 9,053,557 B2
(45) Date of Patent: Jun. 9, 2015

(54) SYSTEM AND METHOD FOR IMPROVING VISUAL EFFECT OF A DISPLAY DEVICE

(75) Inventors: Chen-Wei Lin, Kaohsiung (TW); King-Yuan Ho, Hsinchu County (TW); Jing-Yi Yan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 105 days.

(21) Appl. No.: 13/310,328

(22) Filed: Dec. 2, 2011

(65) Prior Publication Data

US 2013/0141480 A1    Jun. 6, 2013

(51) Int. Cl.
G09G 5/02     (2006.01)
G06T 3/40     (2006.01)
G09G 3/20     (2006.01)

(52) U.S. Cl.
CPC ............ G06T 3/4069 (2013.01); *G09G 3/2003* (2013.01); *G09G 2340/0407* (2013.01)

(58) Field of Classification Search
USPC .................................. 345/211, 428, 690, 698
See application file for complete search history.

(56) References Cited

U.S. PATENT DOCUMENTS

| | | | |
|---|---|---|---|
| 4,383,170 A | 5/1983 | Takagi et al. | |
| 6,266,042 B1 * | 7/2001 | Aratani | 345/698 |
| 6,639,625 B1 | 10/2003 | Ishida et al. | |
| 6,686,956 B1 | 2/2004 | Prakash et al. | |
| 6,710,801 B1 | 3/2004 | Kubo | |
| 7,003,177 B1 | 2/2006 | Mendlovic et al. | |
| 7,689,058 B2 * | 3/2010 | Brown Elliott et al. | 382/260 |
| 7,883,386 B2 | 2/2011 | Ho et al. | |
| 8,354,986 B2 * | 1/2013 | Lin et al. | 345/88 |
| 2002/0140713 A1 * | 10/2002 | Klompenhouwer et al. | 345/690 |
| 2004/0061710 A1 * | 4/2004 | Messing et al. | 345/698 |
| 2006/0044322 A1 | 3/2006 | Chen et al. | |
| 2007/0013649 A1 * | 1/2007 | Kim et al. | 345/107 |
| 2007/0045549 A1 * | 3/2007 | Wang et al. | 250/370.08 |

(Continued)

FOREIGN PATENT DOCUMENTS

| CN | 1949882 (B) | 8/2010 |
|---|---|---|
| CN | 101241666 (B) | 9/2010 |

(Continued)

OTHER PUBLICATIONS

Taiwanese Office Action of Application No. 101106745, dated Sep. 15, 2014 (7 pages).
Chinese Office Action of Chinese Patent Application no. 201210436285.4, dated Jan. 6, 2015 (7 pages).

*Primary Examiner* — Kathy Wang-Hurst
*Assistant Examiner* — Peijie Shen
(74) *Attorney, Agent, or Firm* — Finnegan, Henderson, Farabow, Garrett & Dunner LLP

(57) ABSTRACT

A display system is disclosed. The display system comprises a display device; and a computing device. The computing device executes instructions to receive a first plurality of sub-pixel values of a first plurality of sub-pixels of an image. The first plurality of sub-pixels have a plurality of colors. The computing device further executes instructions to select a first sub-pixel of the first plurality of sub-pixels. The first sub-pixel has a first color and is spatially close to a second sub-pixel of the first plurality of sub-pixels. The second sub-pixel has the first color. The computing device further executes instructions to generate a second plurality of sub-pixel values of a second plurality of sub-pixels based on at least first and second sub-pixel values corresponding to the first and second sub-pixels of the first plurality of sub-pixels.

18 Claims, 11 Drawing Sheets

(56) References Cited

U.S. PATENT DOCUMENTS

| | | | |
|---|---|---|---|
| 2007/0159661 A1* | 7/2007 | Kondo | 358/302 |
| 2007/0263113 A1 | 11/2007 | Baek et al. | |
| 2008/0198185 A1* | 8/2008 | Maruyama et al. | 345/698 |
| 2010/0253796 A1 | 10/2010 | Yano et al. | |
| 2010/0315534 A1 | 12/2010 | Azuma et al. | |
| 2011/0285713 A1* | 11/2011 | Swic et al. | 345/428 |
| 2011/0285714 A1* | 11/2011 | Swic et al. | 345/428 |
| 2012/0120043 A1* | 5/2012 | Cho et al. | 345/211 |

FOREIGN PATENT DOCUMENTS

| | | |
|---|---|---|
| CN | 1997112 (B) | 7/2011 |
| TW | 200709158 A | 3/2007 |
| TW | 200949354 A | 12/2009 |
| TW | 201042604 A1 | 12/2010 |

* cited by examiner

| 502-1 | 504-1 | 502-2 | 504-2 |
|-------|-------|-------|-------|
| 506-1 | 508-1 | 506-2 | 508-2 |
| 502-3 | 504-3 | 502-4 | 504-4 |
| 506-3 | 508-3 | 506-4 | 508-4 |

FIG. 5

| 702-1 | 704-1 | 702-2 | 704-2 |
|-------|-------|-------|-------|
| 706-1 | 708-1 | 706-2 | 708-2 |
| 702-3 | 704-3 | 702-4 | 704-4 |
| 706-3 | 708-3 | 706-4 | 708-4 |

FIG. 7

SYSTEM AND METHOD FOR IMPROVING VISUAL EFFECT OF A DISPLAY DEVICE

FIELD

Example embodiments relate to systems and methods for improving the visual effect of a display device.

BACKGROUND

As the demand for high-resolution display devices increases, several techniques to improve resolution of display devices have drawn much attention. US 2010/0253796 describes taking multiple low-resolution images and applying a weighting function to these low-resolution images to obtain high-resolution images. Similar techniques are also disclosed in U.S. Pat. Nos. 6,686,956 and 7,003,177.

Further, US 2007/0263113 describes a method to obtain high-resolution images of an object by taking multiple low-resolution images each containing only a portion of the object. The multiple low-resolution images are then wielded into a single image containing the object in high-resolution. Similar techniques can be found in U.S. Pat. Nos. 4,383,170, 6,639,625, and 6,710,801.

US 2010/0315534 discloses a method to obtain high-resolution images. The image pick-up system of US 2010/0315534 comprises a first imaging section to take a moving image of each of the R component and the B component with a short-time exposure, a low resolution, and a high frame rate based on the incident light. The image pick-up system also comprises a second imaging section that takes a moving image of the G component with a long-time exposure, a high-resolution, and a low frame rate based on the incident light. The image pick-up system then synthesizes a moving image based on the images taken by the first and second imaging sections.

Recently, organic light-emitting diodes (OLED) have been implemented in display devices due to high color saturation capability to present more vivid images. Light-emitting layers in an OLED display are formed by evaporating color layers onto a substrate through a shadow mask that defines regions and areas of the light-emitting layers. The use of shadow masks in manufacturing OLED display devices has restrained the miniaturization of the pixel structures and thus the resolution of OLED display devices. Therefore, there is a need to improve the resolution of OLED display devices.

SUMMARY OF EMBODIMENTS

Consistent with the disclosure, a display system is provided. The display system comprises a display device and a computing device. The computing device executes instructions to receive a first plurality of sub-pixel values of a first plurality of sub-pixels of an image. The first plurality of sub-pixels have a plurality of colors. The computing device further executes instructions to select a first sub-pixel of the first plurality of sub-pixels. The first sub-pixel has a first color and is spatially close to a second sub-pixel of the first plurality of sub-pixels. The second sub-pixel has the first color. The computing device further executes instructions to generate a second plurality of sub-pixel values of a second plurality of sub-pixels based on at least first and second sub-pixel values corresponding to the first and second sub-pixels of the first plurality of sub-pixels. A number of the second plurality of sub-pixels is smaller than a number of the first plurality of sub-pixels. The computing device further executes instructions to provide the second plurality of sub-pixel values to the display device.

Consistent with the disclosure, a method for processing image data in a display system is provided. The display system comprises a computing device and display device. The method comprises the steps of:

receiving, at the computing device, a first plurality of sub-pixel values of a first plurality of sub-pixels of an image, the first plurality of sub-pixels having a plurality of colors;

selecting, by the computing device, a first sub-pixel of the first plurality of sub-pixels, the first sub-pixel having a first color and being spatially close to a second sub-pixel of the first plurality of sub-pixels, the second sub-pixel having the first color;

generating, by the computing device, a second plurality of sub-pixel values of a second plurality of sub-pixels based on at least first and second sub-pixel values corresponding to the first and second sub-pixels of the first plurality of sub-pixels, a number of the second plurality of sub-pixels being smaller than a number of the first plurality of sub-pixels; and providing, from the computing device, the second plurality of sub-pixel values to the display device.

Consistent with the disclosure, a tangibly embodied non-transitory computer-readable medium storing program code is provided. The program code, when executed by a computing device, causes the computing device to perform at least the above-described method.

BRIEF DESCRIPTION OF THE DRAWINGS

Reference will now be made, by way of example, to the accompanying drawings which show example embodiments of the present application, and in which:

FIG. 5 shows a portion of a normal-resolution display device;

FIG. 7 shows a portion of a normal-resolution display device displaying a portion of a high-resolution image;

DESCRIPTION OF EXAMPLE EMBODIMENTS

Reference will now be made in detail to the example embodiments, which are illustrated in the accompanying drawings.

According to some embodiments, a normal-resolution display device having a given number of sub-pixel structures may display a high-resolution image having a number of sub-pixels greater the number of the sub-pixel structures of the normal-resolution display device. Each of the sub-pixels has a sub-pixel data value. A sub-pixel data value may comprise information such as brightness, location of the sub-pixel, and color of the sub-pixel.

Figure 1:
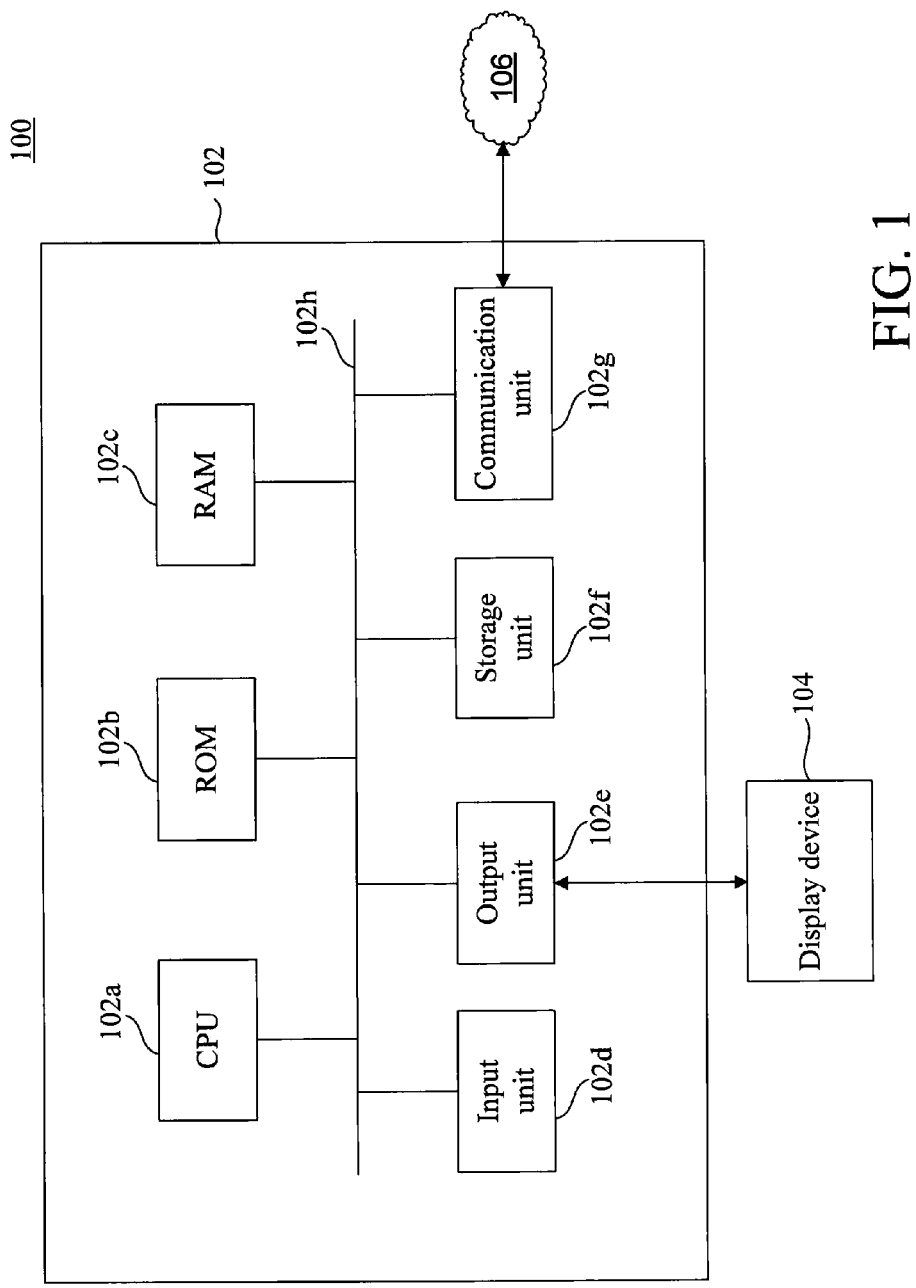
FIG. 1 shows, in block diagram form, an example display system.

Reference is now made to FIG. 1, which shows, in block diagram form, an example display system 100. Display system 100 comprises a computing device 102 and at least one display device 104. Computing device 102 may be coupled to a network 106 or may be a standalone device.

Computing device 102 may be a computer device or a display control circuit. Computing device 102 may comprise one or more central processing units (CPU) 102a, read-only memories (ROM) 102b, random-access memories (RAM) 102c, input units 102d, output units 102e, storage units 102f, and communication units 102g, which can be coupled to each other through one or more buses 102h (not shown). One of ordinary skill in the art can appreciate that one or more of these units of computing device 102 can be added to or removed from the computing device 102 so long as computing device 102 can perform various instructions as described in detail in the following.

CPU 102a, which functions as an arithmetic processing device and a control device, controls or partially controls the operations of the computing device 102 to execute various programs stored in the ROM 102b, the RAM 102c, the storage unit 102f, or a removable recording medium (not shown). ROM 102b stores programs, arithmetic operation parameters, or the like used by CPU 102a. RAM 102c temporarily stores one or more programs used by CPU 102a as it executes specific processing, and parameters when executing the one or more programs.

Input unit 102d is a means operated by the user, such as a mouse, a keyboard, a touch panel, a button, a switch, or a joystick. Further, input unit 102d may be a remote-control device which transmits signals by using infrared or another type of electromagnetic wave. The user of computing device 102 operates input unit 102d to input various types of data or operation instructions to computing device 102.

Storage unit 102f may be a magnetic storage device such as an HDD (hard disk drive), a semiconductor storage device, an optical storage device or a magneto-optical storage device. Storage unit 102f stores programs to be executed by CPU 102a as well as various types of data, images, content, and instructions.

Communication unit 102g connects with network 106. The communication unit 102g may be a communication card for wired or wireless LAN (local area network) communication, Bluetooth communication or WUSB (wireless USB) communication, a router for optical communication, a router for an ADSL (asymmetric digital subscriber line), or a modem used for various types of communication. For example, communication unit 102g can receive or forward image data, programs, or instructions from or to remote devices.

Output unit 102e outputs data or graphic images to a user through an output device. The output device can be a display device 104 such as a CRT (cathode ray tube) display device, a liquid crystal display (LCD) device, a plasma display panel (PDP) device, a light-emitting diode display device, or a field emission display device. The output unit 102e may also be a lamp, an audio output device such as a speaker or a headphone, a printer, a portable telephone, or facsimile machine, capable of providing the user with information in a visual or audio format.

Figure 2:
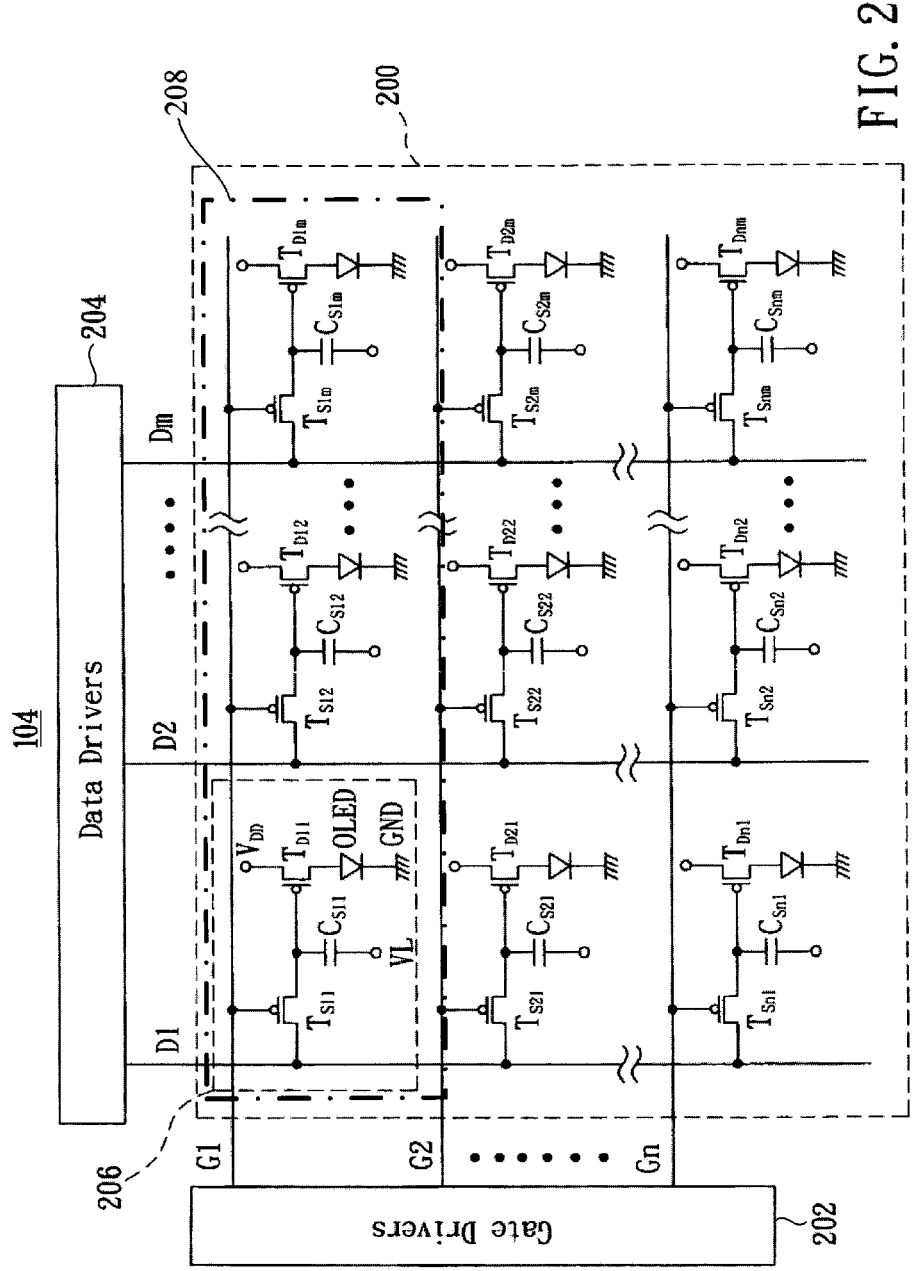
FIG. 2 shows a block diagram illustrating an example OLED display device.

An example display device 104 coupled to output unit 102e is illustrated in FIG. 2, which shows a schematic circuit diagram of equivalent pixel circuits and driver circuits of an OLED display device. Although an OLED display device is illustrated as embodiments here, one of ordinary skill in the art can appreciate that different types of display devices may also be used. The OLED display device comprises a display region 200 which comprises a plurality of sub-pixel structures 206; data lines D1, D2, . . . , Dm; and scanning lines G1, G2, . . . , Gn. The data lines D1-$m$ and scanning lines G1-$n$ are used to control sub-pixel structures 206.

Sub-pixel structures 206 may comprise a switching transistor $T_S$, a driving transistor $T_D$, a storage capacitor $C_s$, and an OLED device. For example, switching transistor $T_{S11}$ comprises a gate electrode coupled to scanning line G1 for controlling the on and off states of switching transistor $T_{S11}$; a source electrode coupled to data line D1 for receiving data signals from data line D1; and a drain electrode coupled to storage capacitor $C_s$ and a gate electrode of driving transistor $T_{D11}$ for storage and control of driving transistor $T_{D11}$. A gate electrode of driving transistor $T_{D11}$ is coupled to the drain electrode of switching transistor $T_{S11}$ and a source electrode of driving transistor $T_{D11}$ is coupled to a voltage source $V_{DD}$ for controlling the driving current according to the storage capacitor $C_{S11}$. One end of storage capacitor $C_{S11}$ is coupled to the drain of switching transistor $T_{S11}$ while the other end is coupled to a reference voltage VL. The anode of the OLED is coupled the drain electrode of driving transistor $T_{D11}$ and the cathode is coupled to the ground GND.

Sub-pixel structures 206 may generate light in, for example, a red, green, blue, or white color. A plurality of sub-pixel structures 206 forms a display pixel structure 208. For example, FIG. 2 shows that display pixel structure 208 comprises three sub-pixel structures 206. A display pixel structure may comprise a red, a green, a blue, and a white color sub-pixel structures to display a desired color. One of ordinary skill in the art can appreciate that different colored sub-pixel structures 206 or a different combination of sub-pixel structures 206 than the above may be arranged to form a display pixel structure.

As understood in the art, the areas occupied by switching transistors $T_S$, driving transistor $T_D$, or storage capacitor $C_S$ are usually non-transparent. Thus, an increase in the number of these components reduces the brightness of an OLED display device. This issue of lowered brightness may be exacerbated in a high-resolution display device in which more transistors are arranged in a predetermined area. In some embodiments of this disclosure, a display system is provided to improve resolution without proportionally increasing the number of switching and driving transistors.

In some embodiment, a display system, such as display system 100, is provided to display high-resolution images. A computing device such as computing device 102 of the display system is configured to execute modules to perform various image processing programs and to provide high-resolution images to one or more display devices, such as display device 104.

Figure 3:
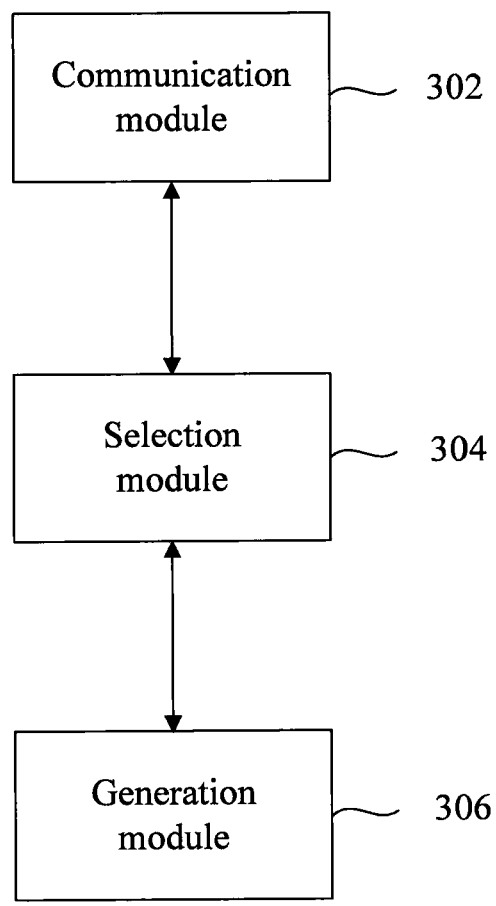
FIG. 3 is a block diagram depicting example modules included in a computing device.

Computing device 102 comprises various modules for executing programs. Example modules comprised in computing device 102 are illustrated in FIG. 3. With reference to FIG. 3, computing device 102 comprises a communication module 302, a selection module 304, and a generation module 306. One could appreciate that one or more modules may be added or removed from a combination of the above modules. As understood by one of ordinary skill in the art, these modules are coupled to one another for performing various functions, and are software modules executed on CPU 102a. Although not shown in FIG. 3, these modules may also be implemented in hardware or a combination of hardware and software.

Communication module 302 is configured to send and receive data. Particularly, communication module 302 is configured to receive display data and send display control signals to a display device. For example, communication module 302 is configured to receive high-resolution image data values and send to the display device display control signals to control a plurality of pixel structures of the display device. The high-resolution display image data values comprise a plurality of sub-pixel data values corresponding to the image pixels. Sub-pixel structures of a display device may be supplied with corresponding sub-pixel data values so as to show the image on the display device.

Selection module 304 is configured to select at least two same-color sub-pixel data values of a high-resolution image. For example, selection module 304 may select a first sub-pixel data value indicating red color, and further select a second sub-pixel data value also indicating red color. The location of a second sub-pixel in the image indicated by the second sub-pixel data value is spatially close to the location of a first sub-pixel indicated by the first sub-pixel data value. Selected sub-pixel data values are forwarded to generation module 306 for further processing. A sub-pixel data value may comprise information such as brightness, location of a sub-pixel, and color of a sub-pixel.

Generation module 306 is configured to receive the selected sub-pixel data values and process the selected sub-pixel data values to generate updated sub-pixel data values. Consistent with some embodiments, two or more sub-pixel data values may be processed to generate one updated sub-pixel data value. In some embodiments, brightness values of the selected sub-pixel data values are averaged to generate an update brightness value of a sub-pixel data value. A sub-pixel structure area to display the updated sub-pixel data value is greater than a sub-pixel structure area to display one original sub-pixel data value.

After generation module 306 generates updated sub-pixel data values, communication module 302 may further be configured to send the updated sub-pixel data values to display device 104 for displaying a desired image.

Figure 4:
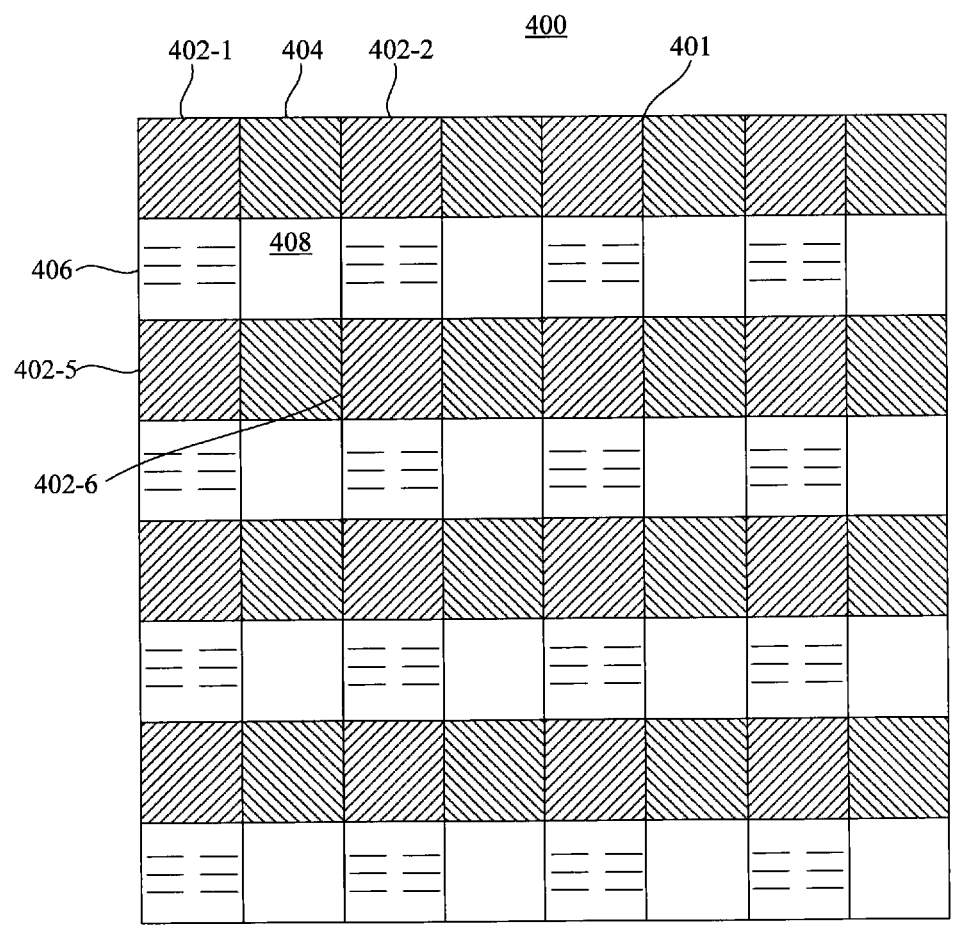
FIG. 4 shows a portion of a high-resolution display device displaying a high-resolution image.

Reference is now made to FIG. 4, which shows a high-resolution display device 400 displaying a high-resolution image 401. High-resolution image 401 comprises a plurality of red-color sub-pixels 402, green-color sub-pixels 404, blue-color sub-pixels 406, and white-color sub-pixels 408. When high-resolution image 401 is displayed on the high-resolution display device 400, each of the sub-pixels is displayed by a corresponding sub-pixel structure of the high-resolution display device 400.

In some embodiments, a pixel structure of a high-resolution display may consist of at least a red, a green, a blue, and a white sub-pixel structures. A pixel structure may be formed by a different number of sub-pixel structures and a different color combination of sub-pixel structures so long as the combination of sub-pixel structures is sufficient to display a desirable image. For example, a pixel structure may comprise a red, a green, and a blue sub-pixel structures; or a red, two green, and a blue sub-pixel structures.

A display device may comprise a number of sub-pixel structures less than the number of sub-pixels of an image to be displayed. Certain sub-pixels may be discarded in favor of matching the sub-pixels to the sub-pixel structures of the display device. The image quality, as a result of such operation, is inevitably degraded. According to some embodiments of this disclosure, a plurality of same-color sub-pixels may be selected to form an updated sub-pixel. A number of updated sub-pixels is less than the number of original sub-pixels. Sub-pixel values of the selected same-color sub-pixels are used to generate an updated sub-pixel value which is then provided to a display device having a number of sub-pixel structures lower than the original number of the sub-pixels of an image.

For example, two same-color sub-pixels of an image may be selected to form an updated sub-pixel. The two sub-pixels may be selected on the basis that they are spatially close to each other. For example, referring to FIG. 4, if red-color sub-pixel 402-1 is selected, red-color sub-pixels 402-2 or 402-5 may be selected as well, to form an updated sub-pixel. The resulting number of the updated sub-pixels is only half the number of original sub-pixel data values when two original sub-pixels are selected. Updated sub-pixels with the updated sub-pixel data values can then be displayed on a display device having a lower number of sub-pixel structures. Note that because an updated sub-pixel value is calculated from two original sub-pixel values, a display quality, for example, a display resolution, as perceived by a human is better than when original sub-pixels are simply discarded. Note also that number of selected sub-pixels is not limited to two. Three or more same-color sub-pixels may be selected on a condition that they are spatially close to one another for generating an update sub-pixel data value. For example, referring to FIG. 4, when red-color sub-pixels 402-1 and 402-2 are selected, a third red-color sub-pixel 402-5 may also be selected for calculation of an updated red-color sub-pixel value. Further, when red-color sub-pixels 402-1, 402-2, and 402-5 are selected, a fourth red-color sub-pixel 402-6 may also be selected for calculation of an updated red-color sub-pixel value. Sub-pixels 402-1, 402-2, 402-5, and 402-6 are selected on the basis that they are spatially close to one other.

Reference will now be made to FIG. 5, which shows a portion of a display device comprising red-color sub-pixel structures 502-1 to 502-4; green-color sub-pixel structures 504-1 to 504-4; blue-color sub-pixel structures 506-1 to 506-4; and white-color sub-pixel structures 508-1 to 508-4. Sub-pixel structures 502-1, 504-1, 506-1, and 508-1 may form a pixel, for example. When the sub-pixel structures are configured to display an image of normal-resolution (e.g., the number of sub-pixels of the image is lower than or equal to the number of sub-pixel structures of the display device), each pixel is perceived by human eyes as an integration of color and brightness of a red sub-pixel structure 502, a green sub-pixel structure 504, a blue sub-pixel structure 506, and white sub-pixel structure 508.

Figure 6A:
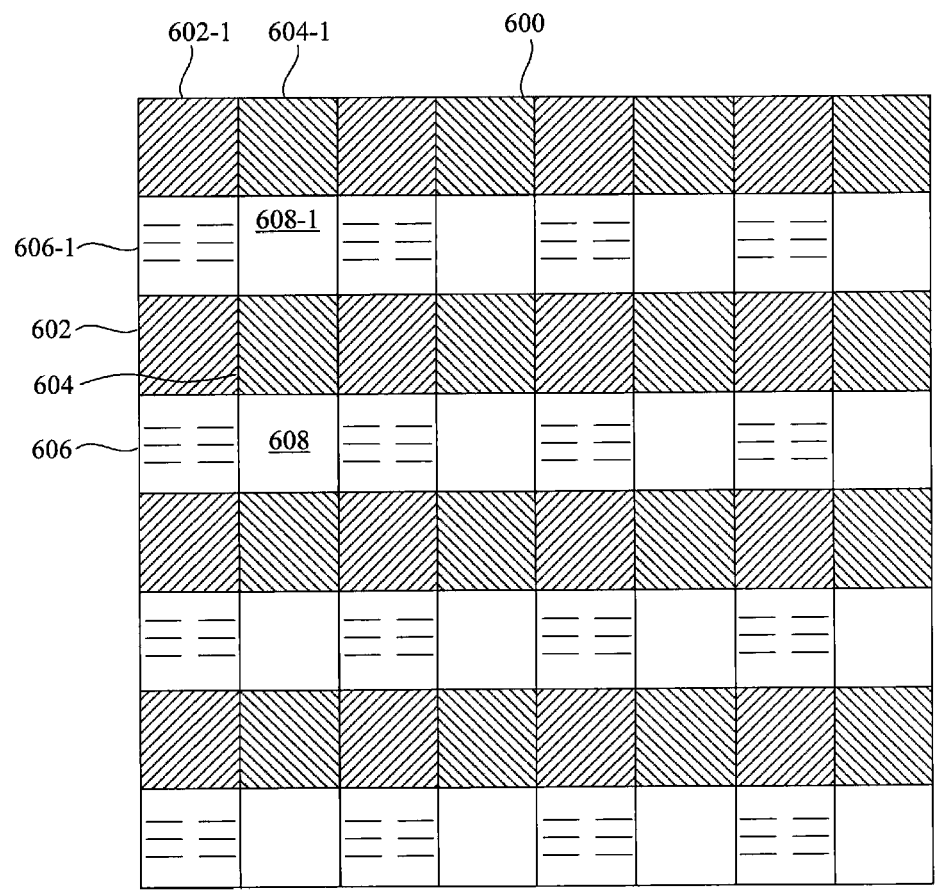
FIG. 6A shows a portion of a high-resolution display device.

FIG. 6A shows a portion of a high-resolution display device comprising red sub-pixel structures 602; green sub-pixel structures 604; blue sub-pixel structures 606; and white sub-pixel structures 608. Four adjacent sub-pixel structures of each of the red, green, blue, and white color may form a pixel structure. For example, sub-pixel structures 602-1, 604-1, 606-1, and 608-1 constitute a pixel structure. Each of the sub-pixel structures is configured to display a corresponding sub-pixel of a high-resolution image. Because the number of sub-pixel structures per area in the high-resolution display device as shown in FIG. 6A is greater than that of the normal-resolution display device as shown in FIG. 5, the image quality displayed on the high-resolution display device is better than that displayed on the normal-resolution display device. However, while a high-resolution display device can display a better image in terms of, for example, resolution, it has a lower light transmission rate resulting from a higher portion of the display area being occupied by opaque pixel-control transistors, such as those shown in FIG. 2. For example, an aperture ratio of the normal-resolution display device as shown in FIG. 5 is about 79% while an aperture ratio of the high-resolution display device as shown in FIG. 6A is about 43%. Therefore, more energy is needed to achieve similar brightness in a high-resolution display device than in a normal-resolution display device.

According to some embodiments of this disclosure, a high-resolution image may be displayed on a normal-resolution display device with improved image quality. Reference will now be made to FIG. 7, which shows a portion of a normal-resolution display device for displaying a portion of a high-resolution image. The portion of the normal-resolution display device comprises red-color sub-pixel structures 702-1 to 702-4; green-color sub-pixel structures 704-1 to 704-4; blue-color sub-pixel structures 706-1 to 706-4; and white-color sub-pixel structures 708-1 to 708-4. Four adjacent red, green, blue, and white sub-pixel structures form a pixel structure. Although the sub-pixel structures of the display device of FIG. 7 are similar to those of FIG. 5, a sub-pixel structure of the display device of FIG. 7 is configured to display an updated sub-pixel having an updated sub-pixel value which is generated by calculating sub-pixel values of a plurality of original, same-color sub-pixels of an high-resolution image. For example, red-color sub-pixel structure 702-1 is configured to display an updated red-color sub-pixel value, which is generated by calculating sub-pixel values of two or more original red-color sub-pixels.

Figure 8:
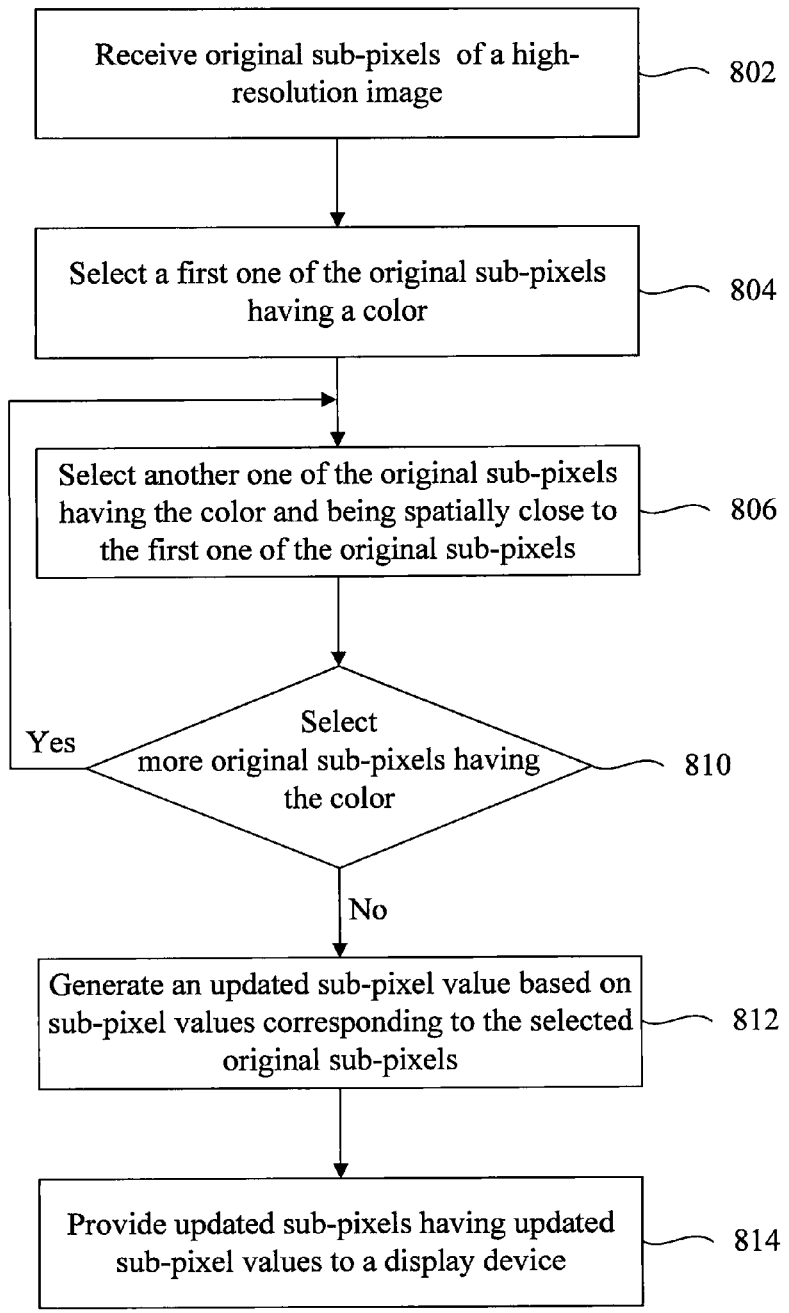
FIG. 8 shows a flowchart representing an example method for generating updated sub-pixel data values.

FIG. 8 shows a flowchart representing an example method to generate updated sub-pixel values from original sub-pixel values. At step 802, a communication module of a computing device receives data regarding original sub-pixels of a high-resolution image to be displayed. At step 804, a selection module of the computing device selects a first one of the original sub-pixels having a first color. At step 806, the selection module selects another original sub-pixel having the same first color. The second sub-pixel is selected on a basis, in part, that it is spatially close to the first sub-pixel. At step 810, the computing device determines whether to select more sub-pixels having the first color. If it is determined that more sub-pixels need to be selected, the method goes back to step 806 to select additional sub-pixels. If it is determined that no additional sub-pixels need to be selected, the method advances to step 812.

At step 812, a generation module of the computing device generates an updated sub-pixel value based on sub-pixel values of the selected original sub-pixels. The generation module may average the brightness values of the selected original sub-pixels to generate a brightness value of the updated sub-pixel, for example. However, the calculation method is not limited to averaging the data of the selected original sub-pixels. Other linear or non-linear calculation methods may be applied to generate updated sub-pixel values. At step 814, the updated sub-pixels having updated sub-pixel values are provided to a display device through the communication module of the computing device.

Figure 6C:
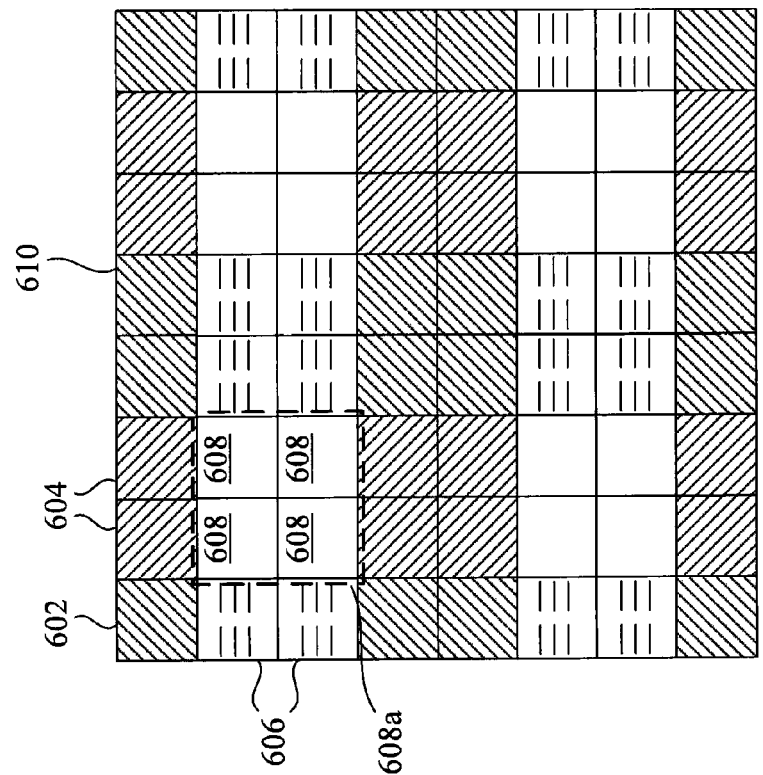
FIG. 6C shows a portion of a high-resolution display device after the rearrangement of FIG. 6B.
Figure 6B:
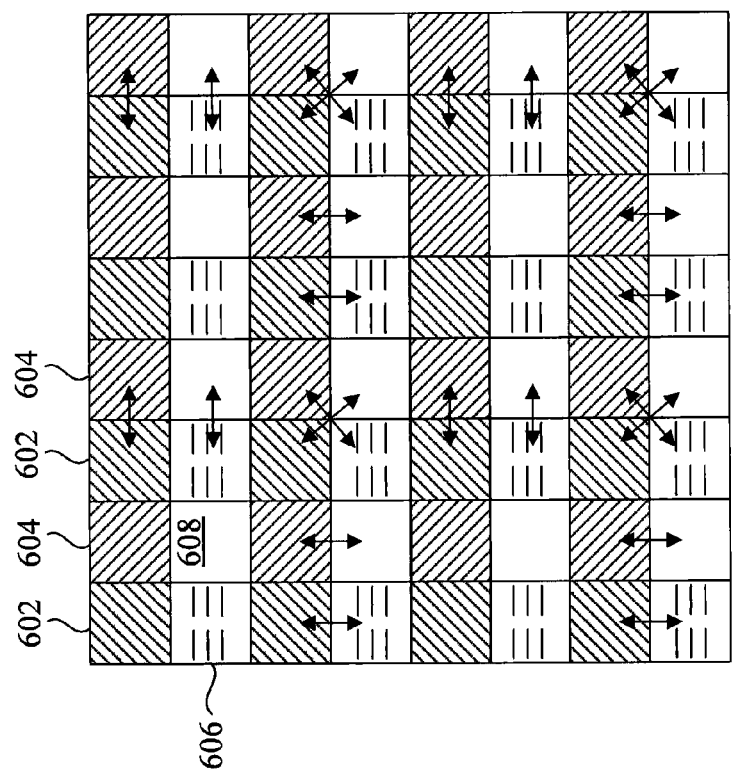
FIG. 6B shows a portion of a high-resolution display device in which sub-pixels are rearranged according to an embodiment.

An example of selecting and calculating the original sub-pixels is illustrated in FIGS. 6A-6C. FIG. 6A shows a high-resolution display device displaying an image 600, which comprises a first plurality of sub-pixels comprising red-color sub-pixels 602, green-color sub-pixels 604, blue-color sub-pixels 606, and white-color sub-pixels 608. The original sub-pixels are selected as if they are re-arranged as shown in FIG. 6B, where a double arrow lying between two sub-pixels indicates that locations of the two sub-pixels are exchanged. For example, the double arrow to the left of the first row indicates that the location of red-color sub-pixel 602 is exchanged with the location of green-color sub-pixel 604. As a result of the re-arrangement of the sub-pixels, the high-resolution image 600 of FIG. 6A is transformed to an updated high-resolution image 610 as shown in FIG. 6C, where four original, same-color sub-pixels are arranged to adjacent to one another. For example, four white-color sub-pixels 608 are arranged to be adjacent to one another. Therefore, it can be understood that four original sub-pixels may be selected to generate an updated sub-pixel according to the re-arrangement of FIGS. 6A-6C. That is, four values of original sub-pixels spatially close to one another may be selected to generate an updated sub-pixel data value. For example, four white-color sub-pixels 608 are selected to form an updated white-color sub-pixel 608a. Note that the number of original sub-pixels to be selected is not limited to four as proposed in this embodiment. The number may be two or more as long as an updated sub-pixel, when displayed by a display, improves the display qualities, such as resolution.

A computing device performing the method as described in FIG. 8 may be a computer device or a display control circuit coupled to a display device.

Figure 9:
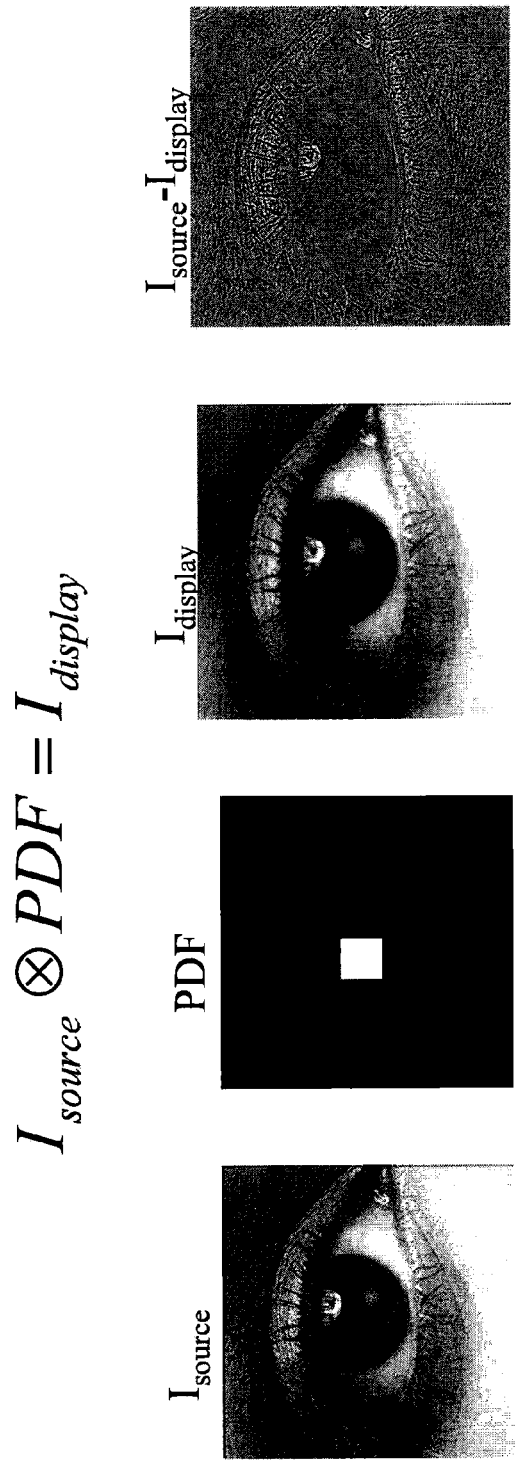
FIG. 9 shows an example image transformation method.

The transformation of a high-resolution image from FIG. 6A to FIG. 6C may be understood as subjecting image 600 of FIG. 6A to a pixel distribution function (PDF) to form image 610 of FIG. 6C. The image transformation as shown in FIGS. 6A-6C can be illustrated as follows.

$$I_{source} \otimes PDF = I_{display} \qquad \text{Eq 1}$$

where $I_{source}$ denotes the source image, $I_{display}$ denotes the displayed image; and PDF denotes pixel distribution function. According to Eq 1, the quality of the displayed image would be affect by the PDF. An example of illustrating Eq 1 is shown in FIG. 9, where $I_{source} - I_{display}$ indicates the difference of the two images. To improve the quality of the displayed image $I_{display}$, inventors propose to keep the difference small as described in the following. Subjecting Eq 1 to Fourier transform forms the following expression.

$$FFT(I_{source}) \times FFT(\alpha PDF) = FFT(I_{display}) \qquad \text{Eq 2}$$

where $\alpha$ denotes the intensity factor of the PDF. Thus, $I_{source}$ may be transformed as follows.

$$[FFT(I_{source})/FFT(\alpha PDF)]\alpha FFT(\alpha PDF) = FFT(I_{source}) \qquad \text{Eq 3}$$

Applying Eq 3 to Eq 2 and subjecting the resulting Eq 2 to reverse Fourier transform form the following expression.

$$iFFT[FFT(I_{source})/FFT(\alpha PDF)]$$
$$\otimes PDF = I_{display} \approx I_{source} \qquad \text{Eq 4}$$

Figure 10:
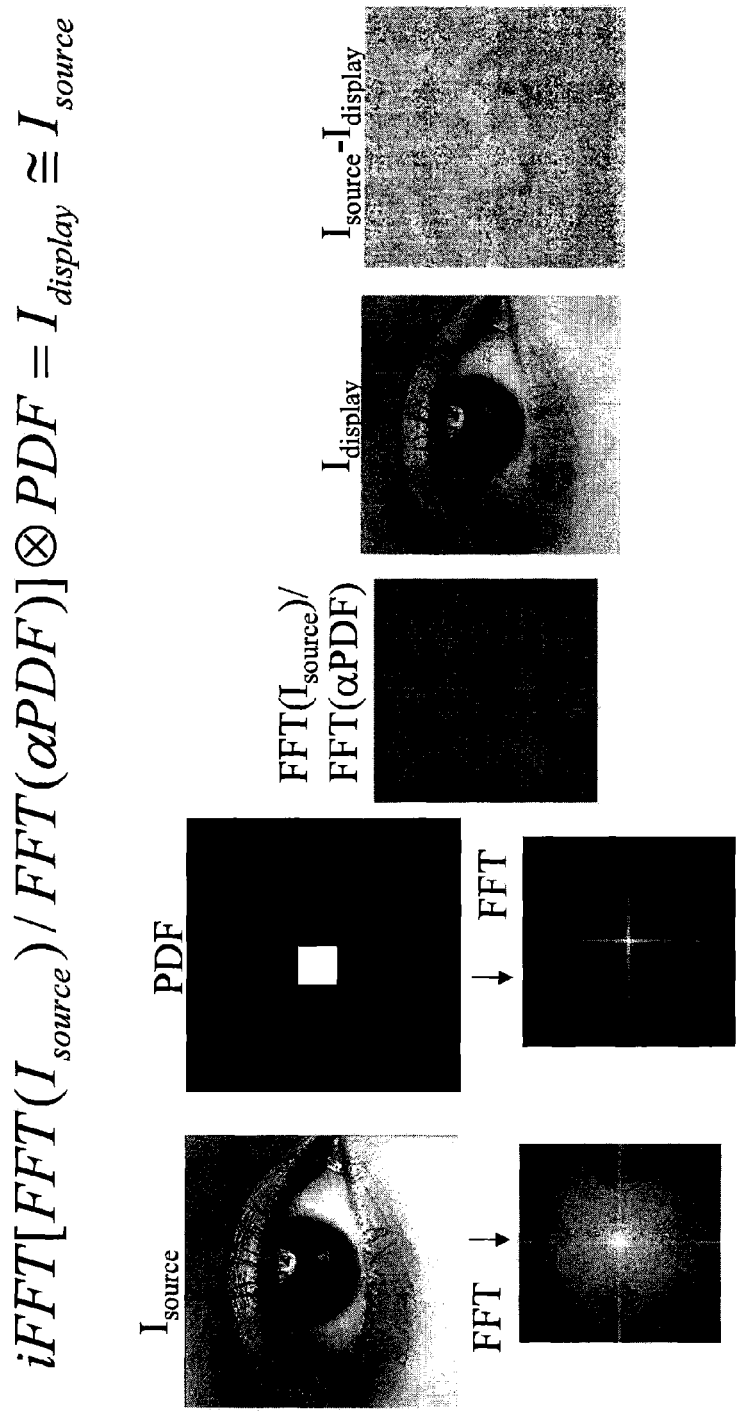
FIG. 10 shows another image transformation method.

Thus, when $I_{source}$ is calculated according to Eq 4, the resulting $I_{display}$ is very close to $I_{source}$. That is, the quality of $I_{display}$ is improved when $I_{source}$ is subject to the operations of Eq 4. An example of illustrating the operation of Eq 4 is shown in FIG. 10, where the difference of $I_{source}$ and $I_{display}$ is nominal.

The operation of Eq 4 may also be executed by a computing device, such as a computer device or a display control circuit coupled to a display device.

According to some embodiments, the above-described methods as executed by a computing device may be realized as program code. The program code may be tangibly stored in a non-transitory computer-readable storage medium. A computing device may read and execute the program code from the non-transitory computer-readable storage medium.

Certain adaptations and modifications of the described embodiments can be made. Therefore, the above discussed embodiments are considered to be illustrative and not restrictive.

Embodiments of the present application are not limited to any particular operating system, device architecture, server architecture, or computer programming language.

What is claimed is:

1. A display system comprising:
a display device; and
a computing device executing instructions to:
receive sub-pixel values of a first plurality of sub-pixels of an image, the first plurality of sub-pixels having a plurality of colors;
select first, second, and third sub-pixels of the first plurality of sub-pixels, the selected sub-pixels having a first color and being spatially close to each other, the selected first and second sub-pixels being in the same row and spaced apart by a fourth sub-pixel of the first plurality of sub-pixels, the selected first and third sub-pixels being in the same column and spaced apart by a fifth sub-pixel of the first plurality of sub-pixels, the fourth and fifth sub-pixels having a color other than the first color;
generate sub-pixel values of a second plurality of sub-pixels:
by exchanging locations of the selected second sub-pixel and the fourth sub-pixel;
by exchanging locations of the selected third sub-pixel and the fifth sub-pixel; and
based on at least sub-pixel values corresponding to the selected first, second, and third sub-pixels; and
provide the sub-pixel values of the second plurality of sub-pixels to the display device.

2. The display system of claim 1, the computing device executing the instructions to generate the sub-pixel values of the second plurality of sub-pixels by averaging brightness values of the selected first, second, and third sub-pixels.

3. The display system of claim 1, wherein a display area corresponding to one of the second plurality of sub-pixels is greater than a display area corresponding to one of the first plurality of sub-pixels.

4. The display system of claim 1, wherein the fourth and fifth sub-pixels of the first plurality of sub-pixels have different colors.

5. The display system of claim 1, the computing device executing the instructions to
select a sixth sub-pixel of the first plurality of sub-pixels, the selected sixth sub-pixel having the first color and being spatially close to one of the selected first, second, or third sub-pixel; and
generate the sub-pixel values of the second plurality of sub-pixels based on at least the sub-pixel values corresponding to the selected first, second, and third sub-pixels and a sub-pixel value corresponding to the selected sixth sub-pixel.

6. The display system of claim 1, wherein the display device is one of a liquid crystal display device, a light-emitting diode display device, a field emission display device, or a plasma display device.

7. The display system of claim 1, wherein the computing device is one of a computer device or a display control circuit.

8. A method for processing image data in a display system comprising a computing device and display device, the method comprising:
receiving, at the computing device, sub-pixel values of a first plurality of sub-pixels of an image, the first plurality of sub-pixels having a plurality of colors;
selecting, by the computing device, first, second, and third sub-pixels of the first plurality of sub-pixels, the selected sub-pixels having a first color and being spatially close to each other, the selected first and second sub-pixels being in the same row and spaced apart by a fourth sub-pixel of the first plurality of sub-pixels, the selected first and third sub-pixels being in the same column and spaced apart by a fifth sub-pixel of the first plurality of sub-pixels, the fourth and fifth sub-pixels of the first plurality of sub-pixels having a color other than the first color;
generating, by the computing device, sub-pixel values of a second plurality of sub-pixels:
by exchanging locations of the selected second sub-pixel and the fourth sub-pixel;
by exchanging locations of the selected third sub-pixel and the fifth sub-pixel; and
based on at least sub-pixel values corresponding to the selected first, second, and third sub-pixels; and
providing, from the computing device, the sub-pixel values of the second plurality of sub-pixels to the display device.

9. The method of claim 8, further comprising averaging, by the computing device, brightness values of the selected first, second, and third sub-pixels to generate the sub-pixel values of the second plurality of sub-pixels.

10. The method of claim 8, wherein a display area corresponding to one of the second plurality of sub-pixels is greater than a display area corresponding to one of the first plurality of sub-pixels.

11. The method of claim 8, wherein the fourth and fifth sub-pixels of the first plurality of sub-pixels have different colors.

12. The method of claim 8, further comprising
selecting, by the computing device, a sixth sub-pixel of the first plurality of sub-pixels, the selected sixth sub-pixel having the first color and being spatially close to one of the selected first, second, or third sub-pixel,
wherein the computing device generates the sub-pixel values of the second plurality of sub-pixels based on at least the sub-pixel values corresponding to the selected first, second, and third sub-pixels and a sub-pixel value corresponding to the selected sixth sub-pixel.

13. The method of claim 8, wherein the display device is one of a liquid crystal display device, a light-emitting diode display device, a field emission display device, or a plasma display device.

14. The method of claim 8, wherein the computing device is one of a computer device or a display control circuit.

15. A tangibly embodied non-transitory computer-readable medium storing program code, the program code being operable, when executed by a computing device, to cause the computing device to perform a method, the method comprising:
receiving, at the computing device, sub-pixel values of a first plurality of sub-pixels of an image, the first plurality of sub-pixels having a plurality of colors;
selecting, by the computing device, first, second, and third sub-pixels of the first plurality of sub-pixels, the selected sub-pixels having a first color and being spatially close to each other, the selected first and second sub-pixels being in the same row and spaced apart by a fourth sub-pixel of the first plurality of sub-pixels, the selected first and third sub-pixels being in the same column and spaced apart by a fifth sub-pixel of the first plurality of sub-pixels, the fourth and fifth sub-pixels of the first plurality of sub-pixels having a color other than the first color;
generating, by the computing device, sub-pixel values of a second plurality of sub-pixels:
by exchanging locations of the selected second sub-pixel and the fourth sub-pixel;

by exchanging locations of the selected third sub-pixel and the fifth sub-pixel; and
based on at least sub-pixel values corresponding to the selected first, second, and third sub-pixels; and
providing, from the computing device, the sub-pixel values of the second plurality of sub-pixels to the display device.

16. The non-transitory computer-readable medium of claim 15, wherein a display area corresponding to one of the second plurality of sub-pixels is greater than a display area corresponding to one of the first plurality of sub-pixels.

17. The non-transitory computer-readable medium of claim 15, wherein the fourth and fifth sub-pixels of the first plurality of sub-pixels have different colors.

18. The non-transitory computer-readable medium of claim 15, wherein the method further comprises:
selecting, by the computing device, a sixth sub-pixel of the first plurality of sub-pixels, the selected sixth sub-pixel having the first color and being spatially close to one of the selected first, second, or third sub-pixel,
wherein the computing device generates the sub-pixel values of the second plurality of sub-pixels based on at least the sub-pixel values corresponding to the selected first, second, and third sub-pixels and a sub-pixel value corresponding to the selected sixth sub-pixel.

* * * * *